United States Patent Office 3,424,776
Patented Jan. 28, 1969

3,424,776
PREPARATION OF METAL CHELATES OF ETHYL-ENEDIAMINE DERIVATIVES CONTAINING AROMATIC RINGS
John A. Gaunt, McIntosh, and Harris E. Petree, Mobile, Ala., assignors to Geigy Chemical Corporation, Ardsley, N.Y., a corporation of Delaware
No Drawing. Filed Aug. 9, 1965, Ser. No. 478,418
U.S. Cl. 260—439                                    19 Claims
Int. Cl. C07f 15/02, 15/04; C05d 9/02

ABSTRACT OF THE DISCLOSURE

A method of preparing a mixture of chelates of a polyvalent metal whose oxide is hydrochloric acid soluble, from a mixture of hydrochloric acid wetted dihydrochlorides of (i) the monoamide N - (alpha - carbamido-ortho - hydroxybenzyl), N' - (alpha - carboxy - ortho-hydroxybenzyl) ethylenediamine, and (ii) ethylene bis (alpha - imino - ortho - hydroxyphenylacetic acid), by mixing those dihydrochlorides of (i) and (ii) while wetted with hydrochloric acid of 15 to 30% HCl in a ratio of 2 to 10 moles of HCl per mole of the mixed dihydrochlorides to a slurry in water with sufficient of the metal oxide to form the mixture of metal chelates to about a 5% excess of oxide. Mixing is continued preferably with heating till the metal oxide dissolves and forms the mixture of polyvalent metal chelates. A particular example mixes an iron oxide with the slurry of the two dihydrochlorides obtained as a hydrochloric acid wetted filter cake from the filtration of the hydrolysis products of ethylene bis(alpha - imino - ortho - hydroxy - phenyl-acetonitrile) as a slurry in hydrochloric acid of 40 to about 43% HCl or of ordinary concentrated hydrochloric acid fortified with 66° Baumé sulfuric acid to provide the equivalent concentration.

This invention is that of a method of preparing polyvalent metal chelates of a mixture of ethylene bis(alpha-imino - ortho - hydroxyphenylacetic acid) compounds, briefly called "APCA - compounds," which mixture consists essentially of (i) a major portion of N - (alpha-carbamido - ortho - hydroxybenzyl), N'-(alpha-carboxy-ortho - hydroxybenzyl) ethylenediamine, briefly called "APCA - mono - amide," and (ii) a minor portion of ethylene bis(alpha-imino - ortho - hydroxyphenylacetic acid), briefly called "APCA - acid"; and in which mixture the chelated polyvalent metal is one which as an oxide can be dissolved by hydrochloric acid.

More specifically the invention is that of a method of preparing such mixture of polyvalent metal chelates by reacting an oxide of any such aforesaid polyvalent metal with a mixture of the dihydrochlorides of the aforesaid APCA - monoamide and APCA - acid and beneficially with that mixture of dihydrohalides being wet with hydrochloric acid. The method comprises reacting an oxide of such polyvalent metal, of which the metal chelate is desired, advantageously with the acid wet filter cake consisting essentially of the dihydrochlorides of APCA-monoamide and APCA-acid and with the hydrochloric acid adhering to it as the filter cake is obtained as the product filtered from the hydrolysis mixture of a relatively recently improved method (described further below) of hydrolyzing ethylenediamine bis(ortho - hydroxy-phenylacetonitrile) to prepare a mixture consisting essentially of APCA-monoamide and APCA-acid.

The method of the invention is applicable particularly for preparing such chelates as those of the polyvalent trace metals that are essential for metabolic processes, for example, iron, copper, manganese, cobalt, zinc, calcium, magnesium, and nickel as in the meatbolic processes in botanical growth; and is applicable especially for preparing an iron chelate particularly the ferric chelate, of the aforesaid mixture of APCA-acid and APCA-mono-amide.

Prior to this invention, such polyvalent metal chelates as, for example, the ferric chelate of these APCA-compounds, and especially of APCA-acid, briefly called "HFe-APCA," were found to be commercially very valuable because of its outstanding effectiveness in overcoming the metal deficiency iron chlorosis in plants, particularly when due to the iron deficiency experienced when they are grown in calcareous soils. However, neither HFe-APCA, nor its alkali metal form NaFe-APCA, has been used as widely extensively as its recognized effectiveness warrants. That is so because its cost has restricted its use primarily to the more costly agricultural products such as ornamental plants and more expensive and high priced crops.

A serious factor in contributing to the high cost of HFe-APCA and of NaFe-APCA as well as that of the corresponding chelates of the aforesaid other polyvalent metals, e.g., the polyvalent essential trace metals, stems from the many steps and chemicals needed for synthesizing APCA-monoamide and/or APCA-acid and for then making the iron, e.g., ferric, chelate from them.

For example, it is known that these APCA-compounds are prepared by condensing one mole of ethylenediamine with two moles of hydroxybenzaldehyde, treating the resulting disalicylidene-ethylenediamine (sometimes designated as the corresponding diimine), while cooling, with liquid hydrogen cyanide to obtain the resulting nitrile, namely, ethylene bis(alpha - imino - ortho - hydroxyphenyl acetonitrile); and then subjecting that nitrile to hydrolysis to convert it to APCA-acid which is reacted with a water-soluble ferric salt, e.g., ferric chloride hexahydrate, to produce the HFe-APCA.

However, the hydrolysis of that nitrile was not complete. Instead it yielded a mixture consisting usually predominately of APCA-acid and APCA-monoamide, along with certain lactam-like related products. This mixture had to be filtered off and then dissolved in excess strong caustic soda solution, and therein heated to complete the hydrolysis of that mixture of intermediate products to yield the desired end product APCA-acid along with a small percentage of the monoamide (both obtained as sodium salt from that highly alkaline solution).

An improvement in the acid hydrolysis step, by working on a slurry of the nitrile in toluene and using especially prepared hydrochloric acid of higher concentration (e.g., from about 40 to 43%) than ordinary concentrated hydrochloric acid (as described in the copending application of Philip G. McCracken, Ser. No. 326,381, filed Nov. 27, 1963, now Patent 3,360,552 of Dec. 26, 1967) avoids formation of the lactam-like side products, but still yields a mixture of APCA-acid and APCA-monoamide with the latter as the major portion. Their ratio in the product mixture from this stronger acid hydrolysis runs from about 60 to 95% of APCA-monoamide to about 40 to 5% of APCA-acid.

That highly acid mixture of APCA-acid and its monoamide apparently does not hydrolyze further, and is separated by filtration leaving a highly acidic wet filter cake. This wet filter cake, containing some 4 to 12 moles of free acid, i.e., as HCl, may be called briefly the "acid wet filter cake from the super-concentrated hydrohalic acid hydrolysis of ethylene bis(alpha-imino-orthohydroxy-phenylacetonitrile)." The latter nitrile can be designated briefly as "APCA-dinitrile."

This acidic filter cake does not hydrolyze further even in presence of that excess acid. Thus, this filter cake likewise has to be dissolved in excess strong (50% aqueous) caustic soda solution and heated therein to complete hydrolysis of the amide group in the APCA-amide portion of the filter cake to the carboxyl group to complete the yield of the end product APCA-acid before conversion as above noted to the desired metal chelate. This second stage of the hydrolysis using the caustic soda not only adds further cost but also results in some loss of desired product (e.g., through decomposition, solubility and handling losses), in the APCA final product as its sodium salt. The latter then is converted to the desired corresponding polyvalent metal chelate.

For example, it is known that the polyvalent metal chelates, such as the iron chelates of these ACPA-compounds, are prepared by dispersing the dihydrochloride or the sodium salt of APCA-acid and/or its monoamide in water and dissolving in it a finely divided water-soluble iron salt or a concentrated solution of it, such as ferric chloride hexahydrate or ferrous sulfate heptahydrate, whereupon the color change corresponding to the particular iron chelate formed occurs.

The method of the invention overcomes the various foregoing earlier shortcomings and disadvantages by providing an advantageous short cut with resultant significant savings in cost not only from eliminating procedural steps but also by reduction in the chemicals used, and yet with at least equivalent yield in active polyvalent metal, such as iron, and effectiveness in the various known applications. Features of the invention other than those already indicated will be recognized from the below more detailed description of the invention.

Considered broadly, the method of the invention comprises (A) preparing in sufficient water and at least agitatable slurry of (a) the hydrochloric acid wet filter cake from the super-concentrated hydrohalic acid hydrolysis of APCA-dinitrile, consisting essentially of a mixture of (i) a major portion of from about 60 to 95% of APCA-monoamide dihydrochloride to (ii) a minor portion of from about 40 to 5% of APCA-acid dihydrochloride, and (iii) which mixture is wet with aqueous hydrochloric acid of at least about 15%, and usually from about 20 to about 30%, HCl content so that it contains from about 4 to about 12, and more often from about 7 to about 9, moles of hydrogen chloride per mole of said admixed APCA-compounds (i.e., of APCA-monoamide and APCA-acid), and (b) a finely divided oxide of the polyvalent metal which as an oxide is soluble in hydrochloric acid; and (B) allowing said polyvalent metal oxide in said slurry to dissolve in the hydrochloric acid and the resulting metal chloride to react with the mixture of dihydrochlorides of said APCA-compounds for a sufficient time to form the corresponding polyvalent metal mixed chelates of these APCA-compounds.

It is generally advantageous to allow the polyvalent metal oxide to dissolve in the aqueous hydrochloric acid medium and to react with the mixed APCA-compounds at an elevated temperature, which can be up to the boiling point of the reaction mixture, although it is beneficial to work at between about 50 and about 100° C. It is best to include the polyvalent metal oxide in an amount at least about sufficient to form its chelate with the amount of mixed APCA-compounds used, and often advantageous to use some excess of the oxide up to at most about 5% of it.

After the polyvalent metal oxide has dissolved and the polyvalent metal chelate has formed, then by neutralizing the acid reaction solution with alkali metal hydroxide, beneficially preferably, caustic soda, there results a slurry of the product, i.e., the desired polyvalent metal mixed APCA-acid and APCA-monoamide chelates. Separation of the product polyvalent metal mixed chelates, say, by filtration, followed by drying of the chelate mixture by suitable, drying methods, yields a product ready for its various uses. Such product, in the case of the ferric chelate, shows in excess of about 6% so-called "active" chelated iron. Neutralization with the alkali need not be to precisely pH 7, for it ordinarily is adequate to about pH 6.5 or can be to about equally above pH 7, with similarly satisfactory results.

While iron has been mentioned more particularly in the foregoing general description of the invention, the method of the invention can be conducted not only with any of the various oxides of iron, namely, ferric oxide ($Fe_2O_3$), ferroso-ferric oxide ($Fe_3O_4$), and ferrous oxide (i.e., FeO), but also with any oxides of other polyvalent metals which as oxides are soluble in hydrochloric acid. The latter includes, for example, other iron group metal oxides as cobaltic oxide, cobaltous oxide, nickelic oxide, and nickelous oxide, as well as the oxides of other essential trace metals such as cupric oxide, cuprous oxide, manganic oxide, manganous oxide, zinc oxide, calcium oxide, magnesium oxide, and also the corresponding oxides of other polyvalent metals which as an oxide dissolve in hydrochloric acid.

While generally it is advantageous to use the various applicable metals in the form of their various oxides, the method of the invention applies equivalently to use of their corresponding hydroxides in place of the oxides. Thus, it is to be understood that in referring to an oxide of any specific metal or of these polyvalent metals broadly, and particularly in any of the claims there is to be included as covered by any such claims, the correspondingly equivalent hydroxide of the specific polyvalent metal or class of polyvalent metals mentioned in such claim.

The method of the invention is illustrated by, but not restricted to the following examples:

EXAMPLE 1

Ferric chelate of APCA-compounds

In a one liter beaker, 102 grams of wet filter cake from the super-concentrated hydrohalic acid hydrolysis of APCA-dinitrile (consisting of 0.10 mole, on dry basis and as determined by chelometric titration, of the hydrochlorides of the APCA-compounds, wet with 57.5 grams of 25% HCl) were admixed with 40 grams of water to provide a stirrable slurry of the filter cake. While stirring this slurry, there was admixed in it 8.2 grams of 98% ferric oxide ($Fe_2O_3$), and the mixture was heated to 75° C. and held at it for one hour, during which the ferric oxide dissolved. The reaction mixture then was diluted immediately with 300 milliliters of water, and the resulting dilute reaction neutralized by addition of 50% aqueous sodium hydroxide to pH 6.5.

The thus neutralized reaction solution was reduced to dryness on a steam hot plate, yielding 82.5 grams of the ferric chelate of the APCA-compounds as a 92.6% yield (on dry basis) with 7.5% total iron, 6.3% active iron, and 48.8% activity.

The foregoing procedure can be carried out with variation in the particular iron oxide, and the reaction temperature of the mixture slurry, for example, at still higher temperature even up to 100° C., although with this specific filter cake and the red iron oxide used with it, higher yields of the order shown were obtained by heating at about 75° C. The drying step also was varied, for example, by evaporting off the water over a steam-bath and then vacuum drying the residue.

EXAMPLE 2

Iron chelate of APCA-compounds from black iron oxide

The procedure of Example 1 is repeated by replacing its quantity of red iron oxide by 7.75 grams of black iron oxide, i.e., ferroso-ferric oxide ($Fe_3O_4$, with correspondingly similar results to give the end product iron chelate of APCA-compounds. In this case better results appear to be obtained by carrying out the reaction at around 55° C.

EXAMPLE 3

Other polyvalent metals of APCA-compounds

The corresponding metal chelate of any other polyvalent metal, whose oxide is dissolved by hydrochloric acid, such as of any of those further hereinabove specifically identified, and especially of any of them which are essential trace metals for the metabolic processes, can be obtained similarly by using the particular metal oxide in such a quantity to provide the metal in the same molal proportion as that of the APCA-compounds in the quantity of wet filter cake used; and then repeating the process of Examples 1 and 2.

In order to avoid making the application prolix to those skilled in this art, it is understood that Examples 1 and 2 are to be considered as if herein repeated separately in full with such quantity of each of the other different metal oxides to provide the same molal proportion of the metal of each said oxide as is present of the APCA-compounds in the quantity of the wet filter cake used; and all as if each of those resulting separate examples then was respectively fully recited herein.

EXAMPLE 4

Metal chelates from mixed hydrochloric and sulfuric acid wetted filter cakes A modification of the hydrolysis process described in the hereinabove identified copending application Ser. No. 326,381, now Patent 3,360,552, is illustrated in an embodiment wherein the hydrochloric acid of higher concentration than ordinary concentrated hydrochloric acid is provided by using a mixture of ordinary concentrated (37%) hydrochloric acid with a sufficient proportion of the concentrated 66° Baumé (or 96%) sulfuric acid to enable providing the required amount of the desired high concentration hydrochloric acid.

The wet filter cake from that modification of that hydrolysis process likewise can be used as the starting material for preparing the metal chelates of this invention.

The wet filter cake obtained from this modification of that hydrolysis process and containing the mixed dihydrochloride and dihydrosulfate addition salts respectively of each of the aforesaid APCA-compounds, is wet, for example, with a mixture of hydrochloric and sulphuric acids of about 15 to about 25% total concentration of both of them and providing from about two to ten moles of mixture of the two acids per mole of mixture of said addition salts of these chelating agents.

Accordingly, each of the steps of the various foregoing Examples 1, 2 and 3 is to be considered as repeated (i.e., using any of the metal oxides referred to in any of them) as showing this further embodiment of this invention wherein the said filter cake (containing the mixed APCA-compounds whose metal chelate is to be made) which is wet with the mixed hydrochloric and sulfuric acids is used as the chelating agent starting material; so long as that filter cake is used in such quantity to provide said agent in relatively the same molal proportion to that of the metal of the metal oxide as is indicated in the various foregoing examples and fuller description of the invention preceding them.

Thus, while the invention has been more fully explained by detailed description of certain specfic embodments of it, it is understood that various modifications and substitutions may be made in any of the specific embodiments within the scope of the appended claims which are intended also to cover equivalents of the specific embodiments.

What is claimed is:

1. The method of preparing a mixture of polyvalent metal chelates, wherein the metal is one which as an oxide is soluble in hydrochloric acid, from a mixture of the dihydrochlorides of (i) a first chelating agent which is the monoamide N-(alpha-carbamido-ortho-hydroxybenzyl, N'-(alpha-carboxy-ortho-hydroxybenzyl) ethylenediamine, and (ii) a second chelating agent which is ethylene bis(alpha-imino-ortho-hydroxyphenylacetic acid), which dihydrochlorides are wetted with hydrochloric acid, which method comprises:

(A) mixing into water, to prepare an at least agitatable slurry therein of,
  (a) a mixture of (i) from about 60 to about 95% of the dihydrochloride of the aforesaid monoamide, and (ii) from about 40 to about 5% of ethylene bis(alpha-imino-ortho - hydroxyphenylacetic acid) dihydrochloride; said mixture of dihydrochlorides initially containing an amount of hydrochloric acid of about 15 to about 30% concentration of hydrogen chloride whereby said dihydrochlorides are initially wet with from about two to about ten moles of hydrogen chloride per mole of them; and
  (b) a hydrochloric acid soluble oxide of a said polyvalent metal in an amount from about sufficient to form said mixed metal chelates with said acid wetted mixture to about a 5% excess of said sufficient amount and in a subdivided form to enable its being agitated into an agitatable slurry with said dihydrochlorides; the water being used in an amount sufficient to enable the quantities used of said reactants (a) and (b) to be agitated therein as an at least agitatable slurry; and (B) allowing said metal oxide to dissolve in the diluted hydrochloric acid and the resulting metal chloride to react with said mixture of dihydrochlorides for a time sufficient to form said polyvalent metal chelates of said first and second chelating agents.

2. The method as claimed in claim 1, wherein the acid wetted mixture of dihydrochlorides of said chelating agents is the filter cake consisting essentially of said dihydrochlorides wetted with the residual hydrochloric acid adhering to them after filtering them out of the mixture of them in the hydrochloric acid containing about 15 to about 30% of hydrogen chloride and resulting from the hydrolysis of ethylene bis(alpha-imino-ortho-hydroxyphenylacetonitrile) in a slurry in the hydrochloric acid of the higher concentration up to about 43%.

3. The method as claimed in claim 2, wherein the filter cake containing dihydrochlorides of said chelating agents is that obtained after filtering out the resulting product after said nitrile was hydrolyzed in a mixture of ordinary 37% concentrated hydrochloric acid with ordinary 66° Baumé sulphuric acid in a ratio to provide an acid concentration equivalent to from about 40 to 43% hydrochloric acid, and said resulting filter cake being wet with the adhering mixed acids remaining after filtering out the product of said hydrolysis.

4. The method as claimed in claim 1, wherein the agitated slurry is heated to allow the dissolution of the oxide and the chelation of the polyvalent metal to occur at between about 50 and 100° C.

5. The method as claimed in claim 1, wherein after the metal oxide is dissolved and the mixed polyvalent metal chelates of said chelating agents has formed, (C) the reaction solution is neutralized with a suitable alkali metal hydroxide; and (D) the resulting alkali metal form of said polyvalent metal chelates of said chelating agents is separated from the reaction mixture.

6. The method as claimed in claim 5, wherein the alkali metal hydroxide is sodium hydroxide.

7. The method as claimed in claim 5, wherein the polyvalent metal oxide is an oxide of an essential trace metal in the metabolic processes.

8. The method as claimed in claim 7, wherein the polyvalent metal is an oxide of one of the iron group of metals.

9. The method as claimed in claim 8, wherein the metal oxide is an iron oxide.

10. The method as claimed in claim 9, wherein the iron oxide is ferric oxide.

11. The method as claimed in claim 9, wherein the iron oxide is ferroso-ferric oxide.

12. The method as claimed in claim 9, wherein the iron oxide is ferrous oxide.

13. The method as claimed in claim 1, wherein the polyvalent metal oxide is an oxide of an essential trace metal in the metabolic processes.

14. The method as claimed in claim 13, wherein the polyvalent metal oxide is an oxide of one of the iron group of metals.

15. The method as claimed in claim 14, wherein the metal oxide is an iron oxide.

16. The method as claimed in claim 15, wherein the iron oxide is ferric oxide.

17. The method as claimed in claim 15, wherein the iron oxide is ferroso-ferric oxide.

18. The method as claimed in claim 15, wherein the iron oxide is ferrous oxide.

19. The method as claimed in claim 1, wherein said mixture (a) thereof is that of the mixed diyhdrochloride and dihydrosulfate addition salts of each of said first and second chelating agents; and their mixture is wet with an amount of a mixture of hydrochloric and sulfuric acids of about 15 to about 25% total concentration of both of them to provide said molal range of acids mixture per mol of the mixture of said acid addition salts of said chelating agents; and said hydrochloric acid soluble metal oxide is used in the said range relative to said mixture of said acid addition salts, and is allowed to dissolve in the diluted hydrochloric and sulfuric acids mixture for the resulting mixture of the chloride and sulfate of its metal to react with said mixture of acid addition salts of said chelating agents to form the desired chelate.

References Cited

UNITED STATES PATENTS

| | | | |
|---|---|---|---|
| 2,921,847 | 1/1960 | Knell et al. | 71—1 |
| 3,028,407 | 4/1962 | Knell et al. | 260—439 |
| 3,095,297 | 6/1963 | Rembe et al. | 71—1 |

OTHER REFERENCES

Willard et al.: Advanced Quantitative Analysis, D. Van Nostrand Co., Inc., New York, N.Y., (1943), p. 32.

TOBIAS E. LEVOW, Primary Examiner.

A. P. DEMERS, Assistant Examiner.

U.S. Cl. X.R.

23—154; 71—1; 260—429, 429.9, 438.1, 519